(12) United States Patent
Clare et al.

(10) Patent No.: US 7,572,747 B2
(45) Date of Patent: Aug. 11, 2009

(54) OPTICAL GLASS

(75) Inventors: Alexis G. Clare, Alfred Station, NY (US); Tatsuji Furuse, Kagoshima (JP); Matthew Hall, Alfred, NY (US)

(73) Assignees: Alfred University, Alfred, NY (US); Kyocera Corporation, Kirishima (JP)

( * ) Notice: Subject to any disclaimer, the term of this patent is extended or adjusted under 35 U.S.C. 154(b) by 0 days.

(21) Appl. No.: 12/238,725

(22) Filed: Sep. 26, 2008

(65) Prior Publication Data

US 2009/0111677 A1    Apr. 30, 2009

Related U.S. Application Data

(60) Provisional application No. 60/975,579, filed on Sep. 27, 2007.

(51) Int. Cl.
*C03C 3/068* (2006.01)
*C03C 3/15* (2006.01)
*C03C 3/23* (2006.01)

(52) U.S. Cl. .............................. 501/78; 501/43; 501/50; 501/51; 501/79

(58) Field of Classification Search .................... 501/43, 501/50, 51, 78, 79
See application file for complete search history.

(56) References Cited

U.S. PATENT DOCUMENTS

| | | |
|---|---|---|
| 3,081,178 A | 3/1963 | Weissenberg et al. |
| 3,811,901 A | 5/1974 | Bacon |
| 3,958,999 A | 5/1976 | Izumitani et al. |
| 5,648,302 A | 7/1997 | Brow et al. |
| 5,693,580 A | 12/1997 | Brow et al. |
| 6,912,093 B2 | 6/2005 | Endo |
| 6,977,232 B2 | 12/2005 | Hayashi et al. |
| 7,138,348 B2 * | 11/2006 | Uehara .......................... 501/64 |
| 2003/0050177 A1 * | 3/2003 | Uehara .......................... 501/78 |

FOREIGN PATENT DOCUMENTS

JP         53004023 A    *    1/1978

* cited by examiner

*Primary Examiner*—Karl E Group
*Assistant Examiner*—Elizabeth A Bolden

(57) ABSTRACT

An optical glass consisting essentially of $B_2O_3$ in an amount of 10-40 wt %, $SiO_2$ in an amount less than or equal to 5 wt %, ZnO in an amount less than or equal to 15 wt %, SrO in an amount less than or equal to 9 wt %, $ZrO_2$ in an amount less than or equal to 9 wt %, $La_2O_3$ in an amount of 15 to 45 wt %, $BaF_2$ in an amount of 1 to 10 wt %, BaO in an amount less than or equal to 5 wt %, $HfO_2$ in an amount of 0.1 to 7.5 wt %, $Gd_2O_3$ in an amount less than or equal to 16 wt %, CaO in an amount less than or equal to 7 wt %, $ZrF_4$ in an amount less than or equal to 5 wt %, $Na_2O$ in an amount less than or equal to 2 wt % and $Y_2O_3$ in an amount less than or equal to 16 wt %. The optical glass has a glass transition temperature in a range of 500-670° C. and a refractive index (nd) in a range of 1.60 to 2.00.

8 Claims, 1 Drawing Sheet

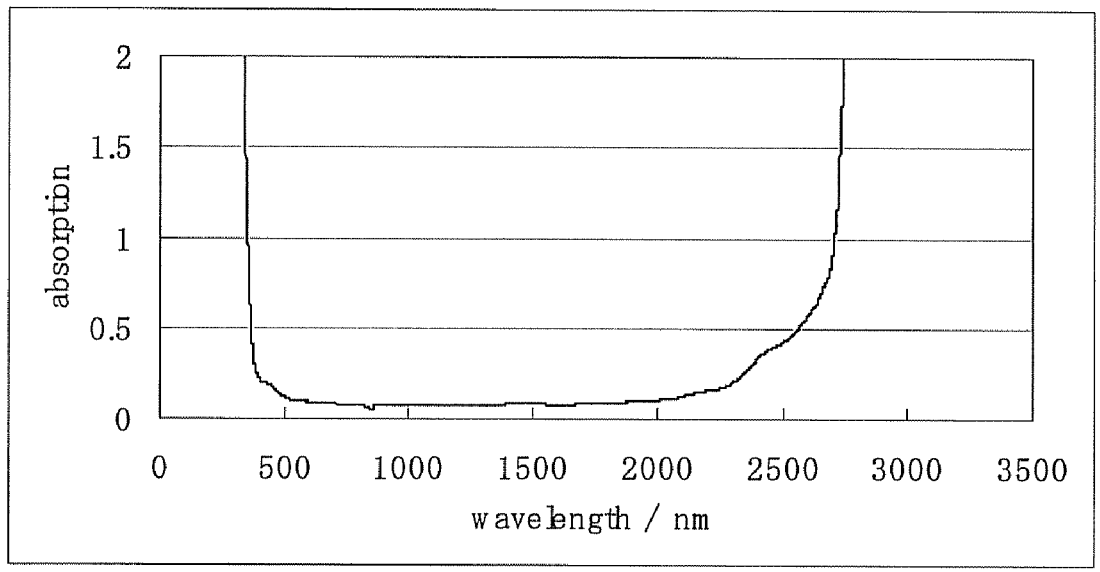
Figure 1 Transmission of glass melt 004
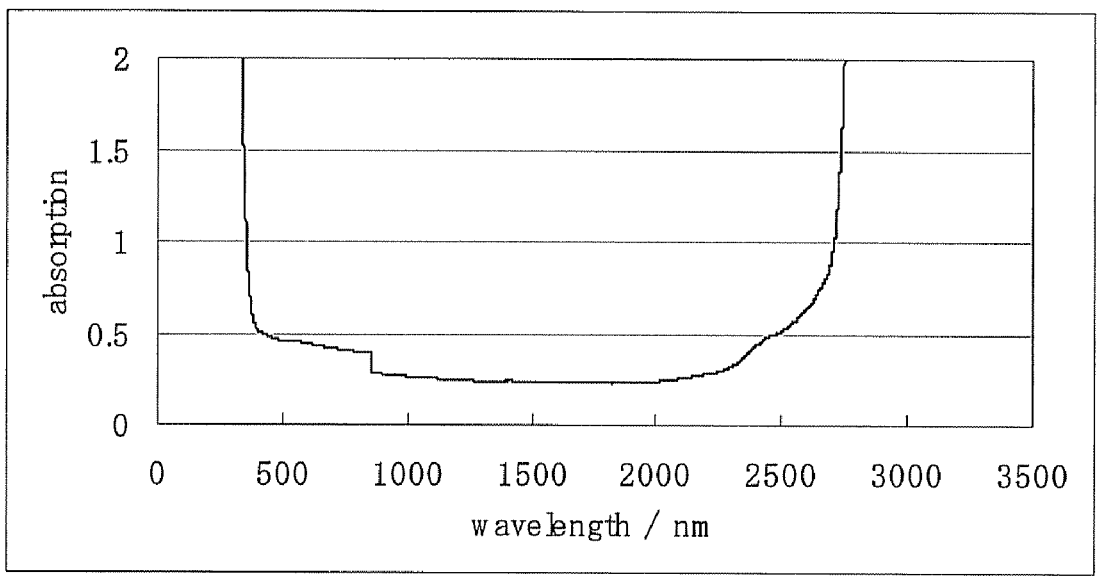
Figure 2 Transmission of glass melt 008

OPTICAL GLASS

FIELD OF THE INVENTION

The present invention relates to optical glass having a low glass transition temperature while also exhibiting a high refractive index for use as a low temperature molded optical component. In particular, the present invention relates to an optical glass having a low glass transition temperature and a high refractive index for forming aspherical lenses for image sensing devices using precision press molding techniques.

BACKGROUND OF THE INVENTION

Conventional glass compositions used in connection with forming optical devices, such as lenses, are known. In the interest of providing smaller, lighter lenses, it has been desirable to increase the refractive index and decrease the dispersion of the glass. Although high refractive index glasses can be made with the inclusion of heavy metals such as lead, these are not desirable elements for environmental reasons. Typically speaking, alternatives to the heavy metals tend to also raise the glass transition temperature ($T_g$), which makes it necessary to use correspondingly high temperature processing conditions to press-form the lenses. Indeed, the thermophysical characteristics of such glasses tend not to be optimal for press molding applications.

Specifically, the molds that are used under the high temperature forming conditions tend to be susceptible to release problems, thermal degradation and breakage, which negatively affect lens production. For example, the diamond-like coating on the mold surfaces of silicon carbide molds can be degraded, which reduces overall lens productivity and shortens the useful life of the molding apparatus. Heretofore, however, more emphasis has traditionally been placed on the importance of providing the desired optical properties over the thermophysical properties.

In view of the above, it is an object of the present invention to provide a glass composition for use in press molding aspherical lenses, for example, that has desirable optical properties, such as a high refractive index, while at the same time also exhibiting suitable thermophysical properties (e.g. $T_g$) so as to allow for lower processing temperatures in order improve lens productivity and extend the useful life if the molding apparatus.

SUMMARY OF THE INVENTION

It is an object of the present invention to overcome the above-mentioned problems associated with the prior art. In particular, it is an object of the present invention to provide an optical glass that has both a low glass transition temperature and a high refractive index, which has been hitherto difficult without the inclusion of heavy metals such as lead and bismuth.

According to one aspect of the present invention, an optical glass is provided, comprising:

$B_2O_3$ in an amount of 10-40 wt %;
$SiO_2$ in an amount less than or equal to 5 wt %;
ZnO in an amount less than or equal to 15 wt %;
SrO in an amount less than or equal to 9 wt %;
$ZrO_2$ in an amount less than or equal to 9 wt %;
$La_2O_3$ in an amount of 15 to 45 wt %;
$BaF_2$ in an amount of 1 to 10 wt %;
BaO in an amount less than or equal to 5 wt %;
$HfO_2$ in an amount of 0.1 to 7.5 wt %;
$Gd_2O_3$ in an amount less than or equal to 16 wt %;
CaO in an amount less than or equal to 7 wt %;
$ZrF_4$ in an amount less than or equal to 5 wt %;
$Na_2O$ in an amount less than or equal to 2 wt %; and
$Y_2O_3$ in an amount less than or equal to 16 wt %.

According to a second aspect of the present invention, the optical glass preferably has a refractive index (nd) in a range of 1.60 to 2.00 and a glass transition temperature ($T_g$) in a range of 500° C. to 670° C.

According to a third aspect of the present invention, the SrO is preferably present in an amount of 1 to 9 wt %, and the optical glass preferably has a refractive index that is greater than 1.70 but does not exceed 1.90 and a glass transition temperature in a range of 500° C. to 670° C.

According to a fourth aspect of the present invention, the SrO is preferably present in an amount of 4 to 9 wt %, the $HfO_2$ is preferably present in an amount of 0.5 to 7.5 wt %, and the optical glass preferably has a refractive index that is greater than 1.70 but does not exceed 1.85 and a glass transition temperature in a range of 520° C. to 650° C.

According to a fifth aspect of the present invention, the SrO is preferably present in an amount of more than 5 wt % to 9 wt %, the $HfO_2$ is preferably present in an amount of 1.5 wt % to 7.5 wt %, and the optical glass preferably has a refractive index that is greater than 1.70 but does not exceed 1.85 and a glass transition temperature in a range of 520° C. to 630° C.

According to a sixth aspect of the present invention, the $SiO_2$ is preferably present in an amount of 1 wt % to 5 wt %, the SrO is preferably present in an amount of more than 5 wt % to 9 wt %, the $HfO_2$ is preferably present in an amount of 1.5 to 7.5 wt %, the CaO is preferably present in an amount of 1.5 wt % to 7 wt % and the optical glass preferably has a refractive index that is greater than 1.70 but does not exceed 1.85 and a glass transition temperature in a range of 520° C. to 630° C.

According to a seventh aspect of the present invention, the $SiO_2$ is preferably present in an amount of 1 wt % to 5 wt %, the ZnO is preferably present in an amount of 3 wt % to 15 wt %, the SrO is preferably present in an amount of more than 5 wt % to 9 wt %, the $HfO_2$ is preferably present in an amount of 1.5 to 7.5 wt %, the CaO is preferably present in an amount of 1.5 wt % to 7 wt %, and the optical glass preferably has a refractive index that is greater than 1.70 but does not exceed 1.80 and a glass transition temperature in a range of 520° C. to 630° C.

According to an eighth aspect of the present invention, the $B_2O_3$ is preferably present in an amount of 20 wt % to 40 wt %, the $SiO_2$ is preferably present in an amount of 1 wt % to 5 wt %, the ZnO is preferably present in an amount of 3 wt % to 15 wt %, the SrO is preferably present in an amount of more than 5 wt % to 9 wt %, the $HfO_2$ is preferably present in an amount of 1.5 to 7.5 wt %, the CaO is preferably present in an amount of 1.5 wt % to 7 wt %, and the optical glass preferably has a refractive index that is greater than 1.70 but does not exceed 1.80 and a glass transition temperature in a range of 530° C. to 610° C.

It is preferred that the glass composition includes a combination of glass network-forming oxides, such as $B_2O_3$ and $SiO_2$. According to the present invention, $B_2O_3$ is preferably provided an a range of 10 to 40 wt %, more preferably 20 to wt 40%, and 1 to 5 wt % of $SiO_2$ is preferably provided. High refractive index and low dispersion glasses are formed by mainly $B_2O_3$ and $SiO_2$ glass compositions. It is important to provide a combination of these glass network formers in order to prevent the resultant glass from experiencing problems with durability.

$BaF_2$, BaO and CaO serve as glass modifiers that reduce the connectivity of the glass structure and contribute to lowering the $T_g$. Particularly, both Ba and $F_2$ have network modifying functions. $BaF_2$ contributes not only to maintaining a high refractive index and also to reduce the glass transition temperature. In addition, the glass transition temperature decreases with increasing Ba content as $La_2O_3$ is replaced with $BaF_2$. Preferably, a mixture of these network modifiers is provided in order to provide the mixed ion effect which serves to reduce the $T_g$. It is also preferred that, in the combination, the $BaF_2$ is present in an amount of at least 1 wt %, and that CaO is present in an amount of at least 1.5 wt % to 7 wt %.

ZnO and SrO are also network modifiers. These refractory components also contribute to providing high refractivity. Preferably, at least ZnO is present in an amount of 3 to 15 wt %. The content of SrO preferably does not exceed 9 wt %. The maximum content of these refractory components is preferably limited to the above amounts, because excessive amounts of these types of refractory components impact the meltability of the glass.

Although $ZrO_2$, $La_2O_3$, $Gd_2O_3$, $ZrF_4$ raise the refractive index, individually speaking, too much of any of these components tend to increase the $T_g$. The combination of components, however, has been found to contribute to providing a high refractive index without raising the $T_g$. It is preferred that the content of $ZrO_2$ content should not exceed 9 wt %. In particular, $La_2O_3$ has been found to raise the refractive index without having any significant negative impact on the $T_g$, and the content $La_2O_3$ is preferably 15 to 45 wt %. The $ZrF_4$ content preferably should not exceed 5 wt %.

The combination of $BaF_2$ and $HfO_2$ serves to increase the refractive index, but the content of these components must be limited or the $T_g$ tends to undesirably increase. In view of the above, the $HfO_2$ content preferably should not exceed 5 wt %. Even in view of the fact that $HfO_2$ is known to be expensive, and is not generally used in glass compositions, the present invention requires that the $HfO_2$ is present in an amount of at least 0.1 wt %, and more preferably 1.5 wt % $HfO_2$.

$Na_2O$ is a modifier and aids in decreasing the $T_g$. $Na_2O$ is preferably present in an amount of 2 wt % or less.

$Y_2O_3$ functions to help raise the refractive index. The $Y_2O_3$ content preferably should not exceed 16 wt %.

BRIEF DESCRIPTION OF THE DRAWINGS

FIG. 1 is a graph showing the transparency of Sample No. 1.

FIG. 2 is a graph showing the transparency of Sample No. 4.

DETAILED DESCRIPTION OF THE INVENTION

The present invention is described herein in connection with the following examples. It should be noted, however, that the scope of the present invention is not limited to the examples herein.

Experimental Procedure

Glass Preparation

Glasses were prepared from 99.5% $H_3BO_3$ and reagent grade $La_2O_3$, $ZnCO_3$, $ZrO_2$, $SrCO_3$, and $SiO_2$. Table 2 shows the glass compositions in batch weight (g) of the $La_2O_3$—ZnO—$B_2O_3$-based glasses. Batches calculated to yield approximately 50 g glass were melted in Pt/Rh crucibles without a lid at 1100-1450° C. for 0.5-1.5 h in air. After the glasses were fined they were removed from the furnace, cast into heated steel molds and allowed to cool freely to a temperature at which they could be transferred to a preheated annealing furnace, provided the annealing temperature was known, or could be surmised. If the annealing temperature was not known the glasses were cooled freely to room temperature and DSC was performed on the glasses to determine the onset of the glass transition temperature $T_g$. Samples were annealed for 1 h at near the glass transition temperatures and then cooled in the furnace to room temperature. Prisms having more than 5×5 mm parallel faces were cut and optically polished in the Kyocera Laboratories.

Measurements

The glass transition temperature was determined using a differential scanning calorimeter (DSC; TA Q10 series). A heating rate of 10° C./min, $N_2$ flow rate of 50 ml/min was used for this instrument. The glass transition temperature, which was determined using the intercept method, is reproducible to within ±3° C. Platinum pans were used for these glasses due to the glass transition temperature for these glasses exceeding that which could be measured using an aluminum pan. Glasses were optically polished with parallel sides and the transmission spectrum was measured with a UV-VIS spectrometer (PERKIN ELMER Lambda 900) at room temperature in the wavelength range of 190 to 3200 nm.

Refractive index was measured on the parallel polished glasses with a J. D. Woolam variable angle spectroscopic elipsometer (VASE). The elipsometry data were taken over the visible range at three different angles of incidence on at least five different points on the surface of the glass. The data were fitted to a Cauchy equation to get the value of refractive index at the sodium D line and to get a measure of the dispersion.

Results

The experimental compositions are shown in Table 1 and the melting condition, annealing condition, appearances and glass transition temperature of the glasses are shown in Table 2 below.

TABLE 1

| | Amount in wt % | | | | | | | | | | | | |
|---|---|---|---|---|---|---|---|---|---|---|---|---|---|
| component | 1 | 2 | 3 | 4 | 5 | 7 | 8 | 10 | 18 | 25 | 31 | 37 | 38 |
| $B_2O_3$ | 30.81 | 30.84 | 28.08 | 30.88 | 30.89 | 30.89 | 27.07 | 30.56 | 27.58 | 27.55 | 28.66 | 23.63 | 29.74 |
| $SiO_2$ | 4.23 | 4.23 | 4.41 | 4.23 | 4.24 | 4.24 | 4.23 | 4.19 | 3.34 | 4.76 | 2.16 | 4.08 | 1.72 |
| ZnO | 13.47 | 13.48 | 14.04 | 13.48 | 13.50 | 13.50 | 13.49 | 13.41 | 10.62 | 12.08 | 10.92 | 6.22 | 11.60 |
| SrO | 3.09 | 3.10 | 5.21 | 3.10 | 5.01 | 5.01 | 5.00 | 2.27 | 5.11 | 5.12 | 1.85 | 7.03 | 7.87 |
| $ZrO_2$ | 7.11 | 7.11 | 7.41 | 7.12 | 7.13 | 7.13 | 7.12 | 7.05 | 6.69 | 7.32 | | | 1.18 |
| $La_2O_3$ | 41.30 | 36.53 | 35.65 | 33.11 | 19.26 | 19.26 | 38.09 | 32.77 | 33.45 | 25.78 | 34.99 | 38.72 | 27.83 |
| $BaF_2$ | | 4.71 | 5.21 | 5.00 | 4.95 | 4.95 | 5.00 | 4.95 | 5.12 | 8.68 | 7.84 | 7.44 | 1.66 |

TABLE 1-continued

| component | 1 | 2 | 3 | 4 | 5 | 7 | 8 | 10 | 18 | 25 | 31 | 37 | 38 |
|---|---|---|---|---|---|---|---|---|---|---|---|---|---|
| BaO | | | | | | | | 3.94 | | | | | |
| $HfO_2$ | | | | 1.15 | | | | 0.84 | 1.18 | 1.20 | 4.56 | 4.32 | 7.26 |
| $Gd_2O_3$ | | | | | 15.02 | | | | | | | | |
| CaO | | | | | | | | | 4.63 | 6.66 | 6.02 | 5.71 | 6.39 |
| $ZrF_4$ | | | | | | | | | 0.98 | 0.86 | 3.00 | 2.84 | 4.76 |
| $Na_2O$ | | | | | | | | | 1.30 | | | | |
| $Y_2O_3$ | | | | | | | 15.02 | | | | | | |

TABLE 2

| Example No. | Composition No. | Melting Conditions | Annealing conditions | Appearance | $T_g$ | nd |
|---|---|---|---|---|---|---|
| | 1 | 1200 C. 1 hour | 625 C. 1 hour | pale yellow & transparent | — | — |
| | 2 | 1100 C. 1 hour | 600 C. 1 hour | colorless & transparent | 611.07 | — |
| | 3 | 1100 C. 1 hour | 600 C. 1 hour | colorless & transparent | 597.98 | 1.7128 |
| | 4 | 1100 C. 1 hour | 600 C. 1 hour | colorless & transparent | 609.92 | — |
| | 5 | 1100 C. 1 hour | 600 C. 1 hour | pale grey & transparent | 610.55 | — |
| | 7 | 1200 C. 1 hour | 605 C. 1 hour | pale yellow & transparent | 620.97 | — |
| | 8 | 1100 C. 1 hour | 600 C. 1 hour | pale grey & transparent | 596.21 | 1.73 |
| | 10 | 1150 C. 1 hour | 590 C. 1 hour | pale yellow & transparent | 610.43 | — |
| | 18 | 1250 C. 1 hour to 1300 | 560 C. 1 hour | pale yellow & transparent | 575.08 | 1.721 |
| | 25 | 1250 C. 1 hour | 590 C. 1 hour | pale yellow & transparent | 584.99 | 1.716 |
| | 31 | 1300 C. 1 hour | 590 C. 1 hour | pale yellow & transparent | 586.49 | 1.7035 |
| | 37 | 1350 C. 1 hour | 590 C. 1 hour | pale yellow & transparent | 594.64 | — |
| | 38 | 1350 C. 1 hour | 590 C. 1 hour | pale yellow & transparent | 586.49 | — |

It can be seen that the glass transition temperature decreases with increasing Sr and Ba content and as $La_2O_3$ was replaced by $BaF_2$. This is because calcium and barium act as glass modifiers and therefore will reduce the connectivity of the glass structure. The increased ionicity of these glasses has a positive effect on dispersion. The addition of gadolinium was successful in contributing to providing a mixed ion effect to reduce the glass transition temperature.

The transparency was measured using UV-VIS spectrometer. The transparency of the samples of the No. 1 and No. 4 glasses are shown in FIGS. 1 and 2. It can be seen that absorption occurs from 2300 nm and 500 nm.

While the present invention has been particularly shown and described with reference to the preferred mode as illustrated in the examples and drawings, it will be understood by one skilled in the art that various changes in detail may be effected therein without departing from the spirit and scope of the invention as defined by the claims.

What is claimed is:

1. An optical glass consisting essentially of:
   $B_2O_3$ in an amount of 10-40 wt %;
   $SiO_2$ in an amount less than or equal to 5 wt %;
   ZnO in an amount less than or equal to 15 wt %;
   SrO in an amount less than or equal to 9 wt %;
   $ZrO_2$ in an amount less than or equal to 9 wt %;
   $La_2O_3$ in an amount of 15 to 45 wt %;
   $BaF_2$ in an amount of 1 to 10 wt %;
   BaO in an amount less than or equal to 5 wt %;
   $HfO_2$ in an amount of 0.1 to 7.5 wt %;
   $Gd_2O_3$ in an amount less than or equal to 16 wt %;
   CaO in an amount less than or equal to 7 wt %;
   $ZrF_4$ in an amount less than or equal to 5 wt %;
   $Na_2O$ in an amount less than or equal to 2 wt %; and
   $Y_2O_3$ in an amount less than or equal to 16 wt %.

2. The optical glass of claim 1, wherein a refractive index (nd) of said optical glass is in a range of 1.60 to 2.00 and a glass transition temperature of said optical glass is in a range of 500° C. to 670° C.

3. The optical glass of claim 1, wherein:
   said SrO is present in an amount of 1 to 9 wt %; and
   wherein said optical glass has a refractive index that is greater than 1.70 but does not exceed 1.90 and a glass transition temperature in a range of 500° C. to 670° C.

4. The optical glass of claim 1, wherein:
   said SrO is present in an amount of 4 to 9 wt %; and
   said $HfO_2$ is present in an amount of 0.5 to 7.5 wt %; and wherein said optical glass has a refractive index that is greater than 1.70 but does not exceed 1.85 and a glass transition temperature in a range of 520° C. to 650° C.

5. The optical glass of claim 1, wherein:

said SrO is present in an amount of more than 5 wt % to 9 wt %; and said $HfO_2$ is present in an amount of 1.5 wt % to 7.5 wt %; and wherein said optical glass has a refractive index that is greater than 1.70 but does not exceed 1.85 and a glass transition temperature in a range of 520° C. to 630° C.

6. The optical glass of claim 1, wherein:

said $SiO_2$ is present in an amount of 1 wt % to 5 wt %;

said SrO is present in an amount of more than 5 wt % to 9 wt %;

said $HfO_2$ is present in an amount of 1.5 to 7.5 wt %; and said CaO is present in an amount of 1.5 wt % to 7 wt %;

wherein said optical glass has a refractive index that is greater than 1.70 but does not exceed 1.85 and a glass transition temperature in a range of 520° C. to 630° C.

7. The optical glass of claim 1, wherein:

said $SiO_2$ is present in an amount of 1 wt % to 5 wt %;

said ZnO is present in an amount of 3 wt % to 15 wt %;

said SrO is present in an amount of more than 5 wt % to 9 wt %;

said $HfO_2$ is present in an amount of 1.5 to 7.5 wt %; and said CaO is present in an amount of 1.5 wt % to 7 wt %; and wherein said optical glass has a refractive index that is greater than 1.70 but does not exceed 1.80 and a glass transition temperature in a range of 520° C. to 630° C.

8. The optical glass of claim 1, wherein:

said $B_2O_3$ is present in an amount of 20 wt % to 40 wt %;

said $SiO_2$ is present in an amount of 1 wt % to 5 wt %;

said ZnO is present in an amount of 3 wt % to 15 wt %;

said SrO is present in an amount of more than 5 wt % to 9 wt %;

said $HfO_2$ is present in an amount of 1.5 to 7.5 wt %; and said CaO is present in an amount of 1.5 wt % to 7 wt %; and wherein said optical glass has a refractive index that is greater than 1.70 but does not exceed 1.80 and a glass transition temperature in a range of 530° C. to 610° C.

\* \* \* \* \*